US010223065B2

(12) United States Patent
Hoa et al.

(10) Patent No.: US 10,223,065 B2
(45) Date of Patent: Mar. 5, 2019

(54) LOCATING AND PRESENTING KEY REGIONS OF A GRAPHICAL USER INTERFACE

(71) Applicant: Apple Inc., Cupertino, CA (US)

(72) Inventors: Patti Pei-Chin Hoa, San Jose, CA (US); Gregory F. Hughes, Cupertino, CA (US); Reginald Dean Hudson, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 381 days.

(21) Appl. No.: 14/871,422

(22) Filed: Sep. 30, 2015

(65) Prior Publication Data
US 2017/0092231 A1    Mar. 30, 2017

(51) Int. Cl.
G06F 3/048 (2013.01)
G06F 3/16 (2006.01)
G06F 9/451 (2018.01)
G06F 8/38 (2018.01)
G06F 9/44 (2018.01)

(52) U.S. Cl.
CPC ........... G06F 3/167 (2013.01); G06F 8/38 (2013.01); G06F 9/4446 (2013.01); G06F 9/453 (2018.02); G06F 2203/04803 (2013.01)

(58) Field of Classification Search
CPC .......... G06F 3/167; G06F 8/38; G06F 9/4446; G06F 2203/04803
USPC ........................................................ 715/727
See application file for complete search history.

(56) References Cited

U.S. PATENT DOCUMENTS

| 6,636,246 | B1  |   | 10/2003 | Gallo et al. |
| 8,037,414 | B2  | * | 10/2011 | Michaelis ........... G06F 3/04812 715/729 |
| 8,340,691 | B1  | * | 12/2012 | Starenky ................ G01C 21/28 455/456.3 |
| 8,418,070 | B2  |   | 4/2013  | Mayer-Ullmann |
| 8,510,288 | B2  |   | 8/2013  | Mital et al. |
| 8,589,488 | B2  | * | 11/2013 | Huston ................... H04W 4/21 709/204 |
| 9,303,997 | B2  | * | 4/2016  | McGavran ............. G01C 21/00 |
| 9,461,972 | B1  | * | 10/2016 | Mehta ................. H04L 63/0435 |
| 9,613,356 | B2  | * | 4/2017  | Edwards ............... H04L 9/3226 |
| 9,851,812 | B2  | * | 12/2017 | Baldwin ................ H04W 4/21 |
| 9,965,141 | B2  | * | 5/2018  | Hughes ............... G06F 3/04812 |
| 2010/0041378 | A1 | * | 2/2010 | Aceves .................. H04W 8/18 455/414.1 |
| 2013/0067315 | A1 | * | 3/2013 | Rakow ................ G06F 3/04886 715/234 |
| 2013/0166494 | A1 | * | 6/2013 | Davis ................. G06Q 30/0269 706/54 |
| 2013/0212487 | A1 | * | 8/2013 | Cote ....................... G06F 3/048 715/745 |

(Continued)

*Primary Examiner* — David Phantana-angkool
(74) *Attorney, Agent, or Firm* — Fish & Richardson P.C.

(57) ABSTRACT

In an example method, an electronic device receives data regarding a graphical user interface to be presented on a display of the electronic device. The electronic device identifies one or more key regions of the graphical user interface based on the received data and one or more rules. The one or more rules pertain to at least one of a geometric shape, a geometric size, a location, or a hierarchical property. The graphical user interface is presented on the display of the electronic device, and the at least one of the key regions of the graphical user interface is indicated using the electronic device.

39 Claims, 9 Drawing Sheets

(56) References Cited

U.S. PATENT DOCUMENTS

| | | | | |
|---|---|---|---|---|
| 2013/0212522 A1* | 8/2013 | Fleizach | ............... | G06F 3/0488 |
| | | | | 715/784 |
| 2013/0232442 A1 | 9/2013 | Groth | | |
| 2014/0129949 A1* | 5/2014 | Singer | ..................... | H04L 67/18 |
| | | | | 715/733 |
| 2014/0181715 A1* | 6/2014 | Axelrod | ................ | G06F 3/0487 |
| | | | | 715/771 |
| 2014/0204035 A1* | 7/2014 | Chang | ................... | G06F 3/0416 |
| | | | | 345/173 |
| 2014/0337791 A1* | 11/2014 | Agnetta | ................ | G06F 3/0481 |
| | | | | 715/784 |
| 2014/0365907 A1* | 12/2014 | De Freitas | ................ | G06F 8/38 |
| | | | | 715/746 |
| 2015/0100498 A1* | 4/2015 | Edwards | ............ | G06Q 20/4012 |
| | | | | 705/72 |
| 2015/0194133 A1* | 7/2015 | Lin | ...................... | G06T 3/0006 |
| | | | | 345/659 |
| 2017/0262164 A1* | 9/2017 | Jain | ....................... | G06F 3/0482 |
| 2018/0154518 A1* | 6/2018 | Rossano | ................. | B25J 9/161 |

\* cited by examiner

LOCATING AND PRESENTING KEY REGIONS OF A GRAPHICAL USER INTERFACE

TECHNICAL FIELD

The disclosure relates generally to generating and presenting graphical user interfaces.

BACKGROUND

A graphical user interface (GUI) is a type of interface that allows users to interact with electronic devices through visual representations of information. Visual representations of information can include, for example, one or more graphical elements, such as text, images, shapes, colors, patterns, or combinations thereof.

In an example implementation, an electronic device can present a GUI to a user (e.g., through a display screen or other output device), and allow the user to interact with the GUI to input commands (e.g., through a mouse, a touch-sensitive panel, a stylus, or other input device). The electronic device can perform various functions in response to the user's interactions.

SUMMARY

Systems, methods, devices and non-transitory, computer-readable mediums are disclosed for identifying and indicating the key regions of a GUI.

In general, in an aspect, a method includes receiving, in an electronic device, data regarding a graphical user interface to be presented on a display of the electronic device. The method also includes identifying, at the electronic device, one or more key regions of the graphical user interface based on the received data and one or more rules. The one or more rules pertain to at least one of a geometric shape, a geometric size, a location, or a hierarchical property. The method also includes presenting, on the display of the electronic device, the graphical user interface. The method also includes indicating, using the electronic device, at least one of the key regions of the graphical user interface.

In general, in another aspect, a system includes a display device, one or more processors, and a non-transitory computer-readable medium including one or more sequences of instructions which, when executed by the one or more processes, causes the system to receive data regarding a graphical user interface to be presented on the display device, and identify one or more key regions of the graphical user interface based on the received data and one or more rules. The one or more rules pertain to at least one of a geometric shape, a geometric size, a location, or a hierarchical property. The system also presents, on the display device, the graphical user interface, and indicates at least one of the key regions of the graphical user interface.

In general, in another aspect, a non-transitory computer-readable medium includes one or more sequences of instructions which, when executed by one or more processors, causes the several operations. The operations include receiving, in an electronic device, data regarding a graphical user interface to be presented on a display of the electronic device. The operations also include identifying, at the electronic device, one or more key regions of the graphical user interface based on the received data and one or more rules. The one or more rules pertain to at least one of a geometric shape, a geometric size, a location, or a hierarchical property. The operations also include presenting, on the display of the electronic device, the graphical user interface. The operations also include indicating, using the electronic device, at least one of the key regions of the graphical user interface.

Implementations of these aspects may include one or more of the following features.

In some implementations, indicating at least one of the key regions of the graphical user interface can include visually indicating, on the display of the electronic device, at least one of the key regions of the graphical user interface.

In some implementations, indicating at least one of the key regions of the graphical user interface can include aurally indicating, using an audio output of the electronic device, information regarding at least one of the key regions of the graphical user interface.

In some implementations, aurally indicating information regarding at least one of the key regions of the graphical user interface can include outputting a spoken description of contents of at least one of the key regions.

In some implementations, identifying the one or more key regions of the graphical user interface can include determining a geometric shape of a portion of the graphical user interface based on the received data, determining that the geometric shape of the portion of the graphical user interface satisfies at least one of the rules, and responsive to determining that the geometric shape of the portion of the graphical user interface satisfies at least one of the rules, identifying the portion of the graphical user interface as one of the key regions.

In some implementations, identifying the one or more key regions of the graphical user interface can include determining a geometric size of a portion of the graphical user interface based on the received data, determining that the geometric size of the portion of the graphical user interface satisfies at least one of the rules, and responsive to determining that the geometric size of the portion of the graphical user interface satisfies at least one of the rules, identifying the portion of the graphical user interface as one of the key regions.

In some implementations, identifying the one or more key regions of the graphical user interface can include determining a location of a portion of the graphical user interface based on the received data, determining that the location of the portion of the graphical user interface satisfies at least one of the rules, and responsive to determining that the location of the portion of the graphical user interface satisfies at least one of the rules, identifying the portion of the graphical user interface as one of the key regions.

In some implementations, identifying the one or more key regions of the graphical user interface can include determining a hierarchical relationship between a portion of the graphical user interface with one or more other portions of the graphical user interface based on the received data, determining that the hierarchical relationship satisfies at least one of the rules, and responsive to determining that the hierarchical relationship satisfies at least one of the rules, identifying the portion of the graphical user interface as one of the key regions.

In some implementations, identifying the one or more key regions of the graphical user interface can include determining contents of a portion of the graphical user interface based on the received data, determining that the contents of the portion of the graphical user interface satisfies at least one of the rules, and responsive to determining that the contents of the portion of the graphical user interface satisfies at least one of the rules, identifying the portion of the graphical user interface as one of the key regions. The contents of the portion of the graphical user interface can include at least one of a button, a radio button, a table, a scroll bar, an icon, a text string, an image, or a text field. The contents of the portion of the graphical user interface can satisfy at least one of the rules if the contents of portion of the graphical user interface contains a particular combination of buttons, radio buttons, tables, scroll bars, icons, text strings, images, and/or text fields.

In some implementations, at least one of the key regions can correspond to a navigation portion of the graphical user interface, a content selection portion of the graphical user interface, or a content presentation portion of the graphical user interface.

In some implementations, the method can further include receiving, at the electronic device, a user input specifying that another identified key region be indicated on the graphical user interface, and responsive to receiving the user input, indicating, using the electronic device, another identified key region of the graphical user interface.

In some implementations, the received data may not explicitly identify portions of the graphical user interface as the one or more key regions.

Other implementations are directed to systems, devices and non-transitory, computer-readable mediums.

Particular implementations provide at least the following advantages. In some cases, an electronic device can provide a user with assistance regarding a GUI, such that the user can readily distinguish relatively important or pertinent portions of a GUI from other portions of the GUI. In some cases, the electronic device can identify key regions of the GUI without having explicit information regarding which of the portions of the GUI correspond to key regions. Thus, the electronic device can identify key regions of a GUI, even if a user, a software developer, an administrator, or some other entity has not previously identified those regions as such. Therefore, the electronic device can provide the user with assistance, even if the GUI had not been designed with this functionality in mind.

Details of one or more implementations are set forth in the accompanying drawings and the description below. Other features, aspects, and potential advantages will be apparent from the description and drawings, and from the claims.

DESCRIPTION

Overview

Figure 1:
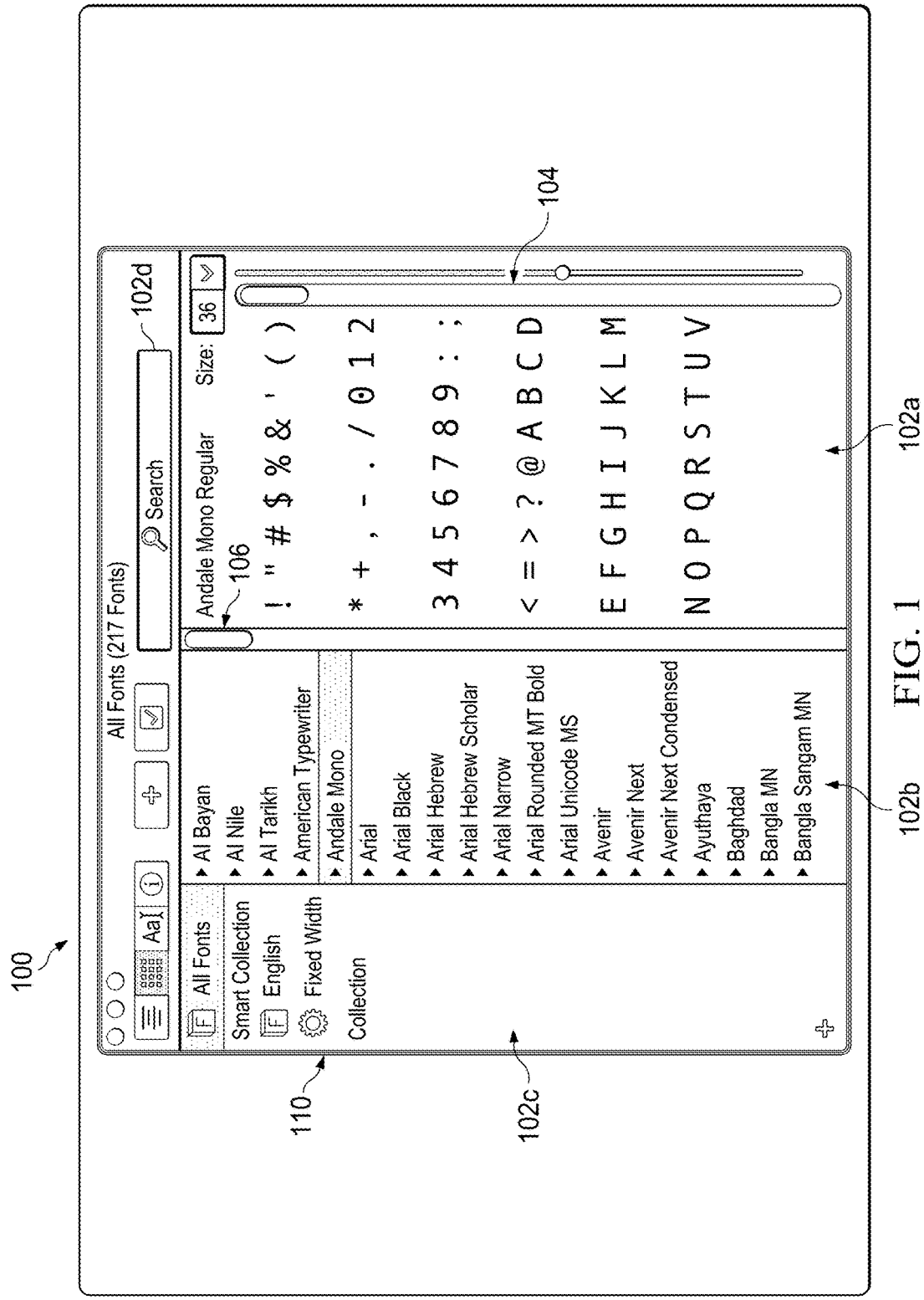
FIG. 1 illustrates an example graphical user interface (GUI).

As a GUI includes one or more graphical elements, a user often must be capable of viewing and interpreting these graphical elements to interact with the GUI. For example, an electronic device can include a GUI that visually presents each of several commands in the form of graphical icons. To instruct the electronic device to execute a particular desired command, the user must view each of the graphical icons, discern which of the icons corresponds to the desired command, then select the appropriate graphical icon on the GUI. As another example, a GUI can visually present a variety of information in each of several portions of the GUI. To find a desired piece of information, the user must view the GUI, then ascertain which portion of the GUI corresponds to the desired piece of information.

However, such a task may be difficult for users with impaired vision. For example, a user with poor vision may be unable to distinguish one graphical icon from other, making it difficult for the user to select a desired command from among several available choices. As another example, a user with poor vision may be unable to distinguish one portion of a GUI from another, making it difficult for the user to ascertain which portions of the GUI are presenting relevant information.

Further, such a task also may be difficult for users who are unwilling or otherwise unable to view the GUI as they interact with the electronic device. For example, a user may find it inconvenient or unsafe to continuously view a GUI as he interacts with an electronic device (e.g., while the user is operating a vehicle, or performing some other task that requires his sight). Thus, although the user is interacting with the GUI, he may be unable to view the GUI as he is doing so. As another example, a user may interact with an electronic device that does not have a display device, and thus, the user cannot view the GUI at all.

The electronic device can provide assistance to the user, such that the user can interpret the information presented by the GUI and interact with the GUI, even if the user has impaired vision, or is unwilling or unable to view the GUI.

In some cases, the electronic device can provide assistance by identifying key regions of the GUI, then providing the user with an indication of these key regions. This can be beneficial, for example, as it allows the electronic device to accentuate portions of the GUI that include relatively important or pertinent information, such that the user can readily distinguish those portions from other portions of the GUI that include relatively unimportant or unrelated information. Key regions of a GUI can include, for example, regions of the GUI that present available commands, selection options, content, and/or other information of relatively greater importance or pertinence to the user. Regions that are not key regions can include, for example, portions of the GUI that are presented solely or primarily for cosmetic or aesthetic purposes, or portions of the GUI that include relatively unimportant or unrelated information.

In some cases, the electronic device can indicate key regions of the GUI visually. For example, the electronic device can highlight, outline, expand, or re-present information from the key regions, such that the key regions and/or the information contained within these regions are more visually distinctive within the GUI. This can be beneficial, for example, in assisting users who have at least some degree of vision, but cannot easily distinguish between the graphical elements of the GUI.

In some cases, the electronic device can indicate key regions of the GUI aurally. For example, the electronic device can generate spoken audio, sound effects, music, or other audio indications, such that the key regions and/or the information contained within these regions are aurally indicated to the user. This can be beneficial, for example, in assisting users who cannot view the GUI at all (e.g., users who are blind, or otherwise unwilling or unable to view the GUI). This also can be beneficial, for example, in assisting users who wish to receive information through senses other than sight. In some cases, visual indications, aural indications, or a combination of both can be used to indicate the key regions and/or the information contained within these regions.

In some cases, an electronic device can identify one or more key regions of the GUI by parsing information from the GUI, and interpreting the parsed information according to one or more rules. These rules can define various properties and conditions upon which a portion of a GUI can be identified a key region. For example, a rule can specify that portions of a GUI having particular geometric shapes are key regions of the GUI. As another example, a rule can specify that portions of a GUI having particular geometric sizes are key regions of the GUI. As yet another example, a rule can specify that portions of a GUI positioned in a particular location of the GUI are key regions of the GUI. As yet another example, a rule can specify that portions of a GUI having a particular hierarchical property with respect to other portions of the GUI are key regions of the GUI. As yet another example, a rule can specify that portions of a GUI having particular contents, types of content, or combinations thereof are key regions of the GUI. In some cases, several different rules can be used in conjunction to determine which portions of the GUI are key regions.

This can be beneficial, for example, as it allows the electronic device to identify key regions of the GUI without having explicit information regarding which of the portions of the GUI correspond to key regions. Thus, the electronic device can identify key regions of a GUI, even if a user, a software developer, an administrator, or some other entity has not previously identified those regions as such. For example, when a software developer develops an application having a GUI, the software developer need not specifically include information that explicitly identifies each of the portions of the GUI as key regions. Instead, the electronic device can parse the GUI, then automatically make a determination based on one or more rules. As such, the electronic device can provide the user with assistance, even if the GUI had not been designed with this functionality in mind.

FIG. 1 shows an example GUI 100. In this example, the GUI 100 includes a window 110 that presents information regarding fonts that are installed on an electronic device. A user can use the GUI 100, for example, to browse through these fonts, search for one or more fonts of interest, and view more information regarding a selected font.

The window 110 includes several portions 102*a-d*, each positioned at a different location on the window 110. For example, the window 110 includes a content region 102*a* that presents information to a user. In the example shown, the content region 102*a* displays detailed information regarding a particular font (e.g., exemplary characters using the "Andale Mono Regular" typeface). Here, the content region 102*a* includes too much information to display at once. Thus, the content region 102*a* also includes a scroll bar 104 that allows a user to scroll through the information.

The window 110 also includes a content navigator region 102*b* that allows the user to select information that he wishes to view. Based on the user's selection, the content region 102*a* is updated in response. For instance, in this example, the content navigator region 102*b* includes a list of fonts that are available on the electronic device. A user can select one of the listed fonts, and in response, the content region 102*a* updates by displaying information regarding the selected font. In some cases, the relationship between the content region 102*a* and the content navigator region 102*b* can be a hierarchical relationship. For example, the content region 102*a* can be organized on a first hierarchical level (e.g., a "child" level), and the content navigator region 102*b* can be organized on a second hierarchical level above the first hierarchical level (e.g., a "parent" level). Here, the content navigator region 102*b* also includes too much information to display at once. Thus, the content navigator region 102*b* also includes a scroll bar 106 that allows a user to scroll through the information.

The window 110 also includes a top level navigator region 102*c* that also allows the user to select information that he wishes to view. Based on the user's selection, the content region 102*a*, the content navigator region 102*b*, or both, are updated in response. For instance, in this example, the top level navigator region 102*c* includes an option to view all fonts that are available on the electronic device, and options to view a subset of those fonts (e.g., different "collections" of fonts). A user can select one of the options, and in response, the content navigator region 102*b* updates by displaying a list of fonts according to the user's selection. The content region 102*a* also updates by displaying information regarding one of the fonts listed in the content navigator region 102*b*. In some cases, the relationship between the content region 102*a*, the content navigator region 102*b*, and the top level navigator region 102*c* can be a hierarchical relationship. For example, the content region 102*a* can be organized on a first hierarchical level (e.g., a "child" level), the content navigator region 102*b* can be organized on a second hierarchical level above the first hierarchical level (e.g., a "parent" level), and the top level navigator region 102*c* can be organized on a third hierarchical level above the first and second hierarchical levels (e.g., a "grandparent" level).

The window 110 also includes a search bar 102*d*. The search bar 102*d* provides an input region that allows the user to input one or more criteria to filter the information shown in the window 110. For instance, in this example, a user can input a text string into the search bar 102*d*, and in response, the window 110 displays one or more fonts matching the entered text string.

As described above, a user typically must be capable of viewing and interpreting each of the portions 102*a-d* to effectively interact with the GUI 100. However, such a task may be difficult for users with impaired vision, or for users who are unwilling or otherwise unable to view the GUI 100 as they interact with the electronic device. In these situations, the electronic device can provide assistance to the user, such that the user can interpret the information presented by the GUI 100 and interact with the GUI 100, even if the user has impaired vision, or is unwilling or unable to view the GUI.

Figure 2A:
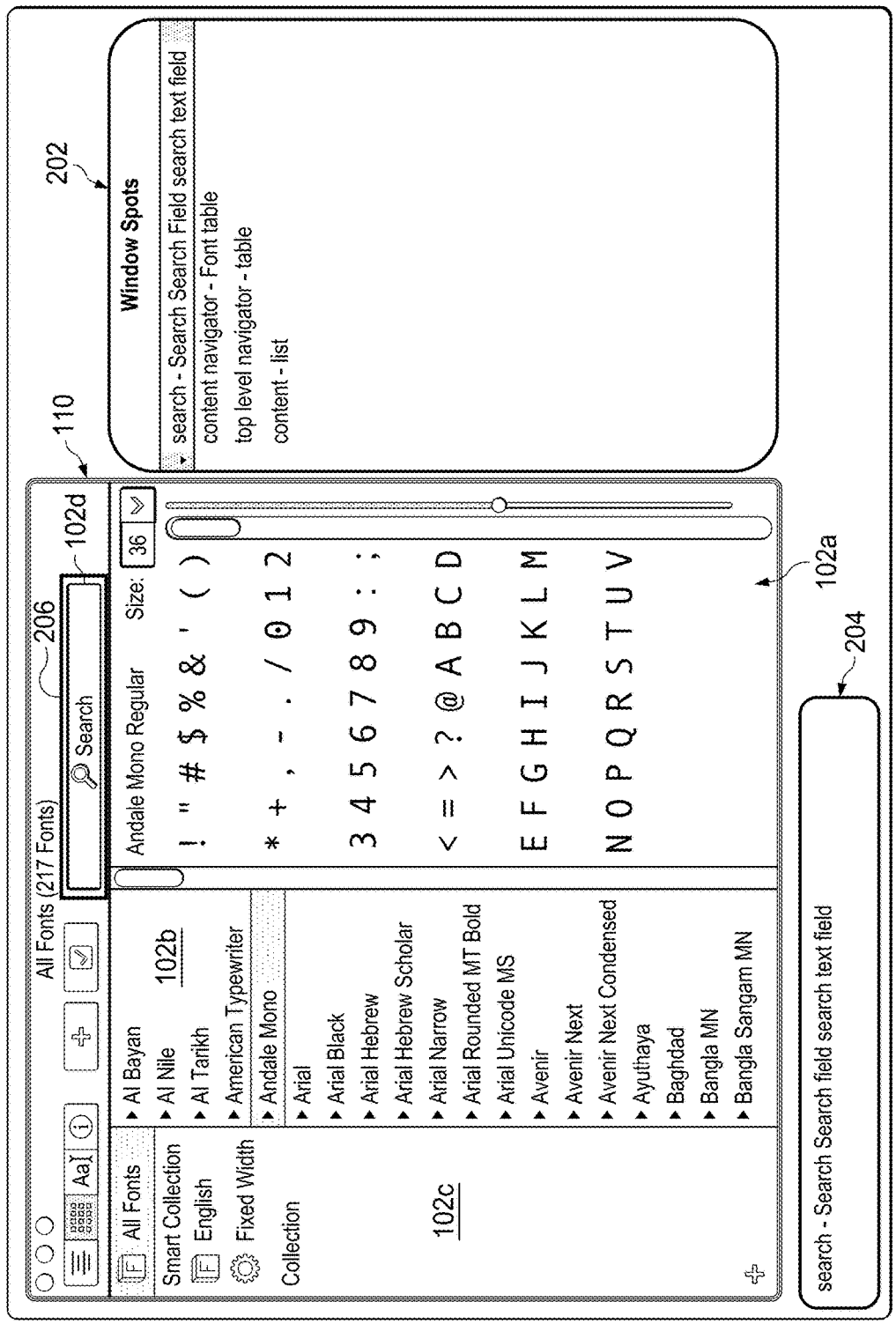
FIGS. 2A-D and 3 illustrate the GUI of FIG. 1 in an accessibility mode.

FIG. 2A illustrates an example of how the electronic device can provide assistance to a user. In this example, FIG. 2A shows a GUI 100. As with FIG. 1, the GUI 100 includes a window 110 that includes several portions, including a content region 102*a*, a content navigator region 102*b*, a top level navigator region 102*c*, and a search bar 102*d*. As shown in FIG. 2A, the GUI 100 also includes two additional windows 202 and 204 that provide information regarding particular portions of the GUI 100. In some cases, this configuration can be referred to as an "accessibility" mode.

In some cases, the accessibility mode can be selectively activated and deactivated by a user. For instance, when a user is viewing the GUI 100 and wishes to receive assistance from his electronic device, he can input a command to invoke the accessibility mode. As examples, the user can input one or more keystrokes on a keyboard, perform one or more clicks on a mouse, perform one or more gestures using an input device, utter one or more words or phrases into a microphone, or a combination thereof. In response, the electronic device can invoke the accessibility mode to provide assistance to the user.

In some cases, the accessibility mode can be automatically activated and deactivated by a user. For instance, the electronic device can record information regarding each of several users, including information regarding the user's preferences with respect to the accessibility mode. When each user logs onto the electronic device, the electronic device retrieves that user's preferences regarding the accessibility mode. In response, the electronic device can invoke the accessibility mode for users who wish to use it, and deactivate the accessibility mode for users who do not wish to use it. In some cases, an electronic device can automatically activate and deactivate the accessibility mode, and also allow a user to selectively activate and deactivate as he desires.

Windows 202 and 204 present information from the window 110, such that the information is more readily understandable to a user. For instance, the window 202 lists each of several key regions of the GUI 100. In the example shown in FIG. 2A, the window 202 lists the content region 102a, the content navigator region 102b, the top level navigator region 102c, and the search bar 102d. The user can cycle through this listing to select a particular portion of the GUI 100 that he is interested in. For example, as shown in FIG. 2A, the search bar 102d is selected. In response, the GUI 100 visually indicates the search bar 102d with an outline 206 around the search bar 102d. This visual indication allows the user to more readily identify the search bar 102d, and visually distinguish it from the other portions of the GUI 100.

Although an outline 206 is shown in FIG. 2A, this is merely an illustrative example. In practice, other visual indications can be used, either instead of or in addition to an outline. For example, in some cases, key regions of the GUI 100 can be visually indicated using different colors (e.g., by highlighting the selected portion using a unique or contrasting color), using animations (e.g., by rendering a moving box or object to draw the user's attention to the selected portion), changing the size of the selected portion (e.g., by expanding the selected portion such that it is larger), or combinations thereof.

The window 204 presents information regarding the selected key region of the GUI 100. This can include, for example, a name of the key region portion, a description of the selected key region, information contained within the selected key region, or a combination thereof. For example, as shown in FIG. 2A, the search bar 102d is currently selected. Thus, window 204 presents information regarding the search bar 102d.

The windows 202 and 204 can present information in a manner that is more easily read by a user. For example, the windows 202 and 204 can present information using highly contrasting colors (e.g., white and black), using a particular typeface (e.g., an easy to read typeface), and/or using a larger font size than those used in the window 110. In re-presenting the information in this manner, the windows 202 and 204 improve the legibility of the information, which may be of particular benefit for people who have difficulty reading smaller text, text rendered using low contrast colors, and/or text rendered using difficult to read typefaces.

In some cases, an electronic device can identify one or more key regions of the GUI by parsing information from the GUI, and interpreting the parsed information according to one or more rules. These key regions can then be indicated to the user (e.g., using an outline 206, as shown in FIG. 2A), and information region these key regions can be presented to the user (e.g., using the windows 202 and 204). Key regions can be, for example, portions of the GUI that include relatively important or pertinent information options, or selections (e.g., the content region 102a, the content navigator region 102b, the top level navigator region 102c, or search bar 102d shown in FIG. 1). This can be beneficial, for example, as it allows the electronic device to identify key regions of the GUI without having explicit information regarding which of the portions of the GUI correspond to key regions. Thus, the electronic device can identify key regions of a GUI and indicate those regions to the user, even if a user, a software developer, an administrator, or some other entity has not previously identified those regions as such.

In some cases, the electronic device can parse information from the GUI by parsing the underlying computer code that was used to generate or render the GUI. For example, an application might include computer code that, when executed by the electronic device, causes the electronic device to generate and present one or more visual elements on a device screen (e.g., the visual elements shown in window 110 of GUI 100). The electronic device can parse the computer code to identify each of the visual elements and determine the properties of those visual elements. For example, the electronic device can parse the computer code to identify the name of the visual element, the content of the visual element, the size of the visual element, the shape of the visual element, the location of the visual element on the GUI, the hierarchical relationship between the visual element and other visual elements, and so forth.

In some cases, the electronic device can parse information from the GUI by parsing the generated or rendered GUI (e.g., an image representing the GUI 100 shown in FIGS. 1 and 2A, such as a screen capture). The electronic device can parse an image of the GUI (or some other graphical representation of the GUI), and using image analysis, identify each of the visual elements and determine the properties of those visual elements. For example, the electronic device can parse the image to identify the name of the visual element, the content of the visual element, the shape of the visual element, the location of the visual element on the GUI, the hierarchical relationship between the visual element and other visual elements, and so forth.

The electronic device can identify one or more key regions of the GUI by interpreting the parsed information according to one or more rules. These rules can define various properties and conditions upon which a portion of a GUI can be identified a key region. Example rules are discussed in further detail below.

In some cases, the electronic device can also aurally indicate the selected region, either instead of or in addition to visually indicating the selected region. For example, the electronic device can generate a spoken description of the information contained within the windows 202 and/or 204, such that the user can understand the contents of the window 110 without having to view the GUI 100. As another example, the electronic device can generate music, sound effects, or other audio indications to provide information regarding the selected region. For example, each key region of the GUI 100 can be associated with a particular unique sound, and the electronic device can playback these sounds to indicate which key region of the GUI 100 has been selected.

Figure 2B:
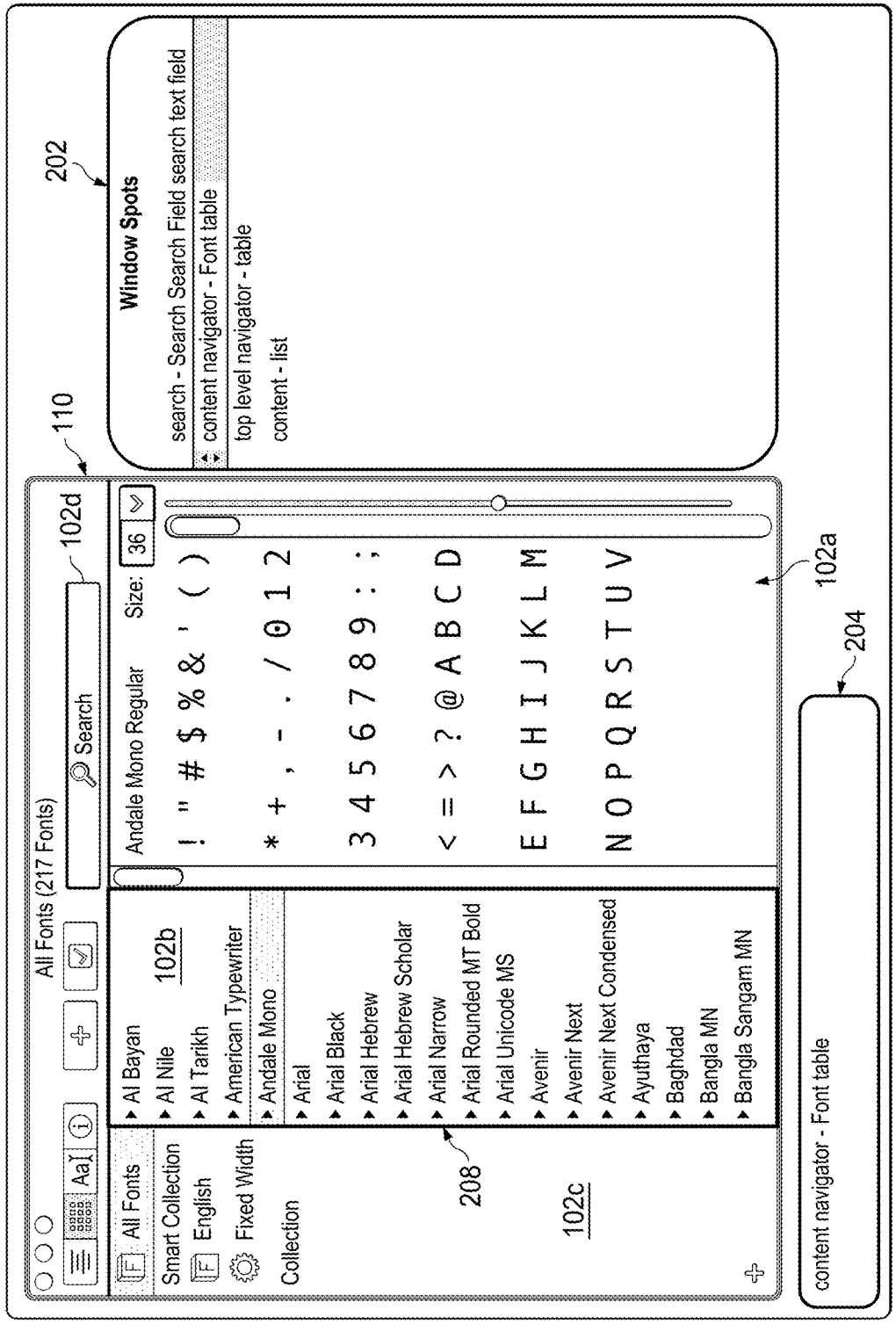

While the GUI 100 is in accessibility mode, the user can cycle through each of the key regions of the GUI, such that different key regions of the GUI 100 are indicated, and information regarding those key regions are presented to the user. For instance, the user can input a command instructing the electronic device to cycle to the next key region of the GUI 100 listed in the window 202 (e.g., by inputting one or more keystrokes on a keyboard, performing one or more clicks on a mouse, performing one or more gestures using an input device, uttering one or more words or phrases, or a combination thereof). In response, the GUI 100 updates by visually and/or aurally indicating the next key region of the GUI 100, and by providing the user with information regarding the selected key region. For example, as shown in FIG. 2B, the user can instruct the electronic device to cycle forward on the list to the content navigator region 102b. In response, the GUI 100 visually indicates the content navigator region 102b with an outline 208 around the content navigator region 102b. Similarly, the window 204 updates to display information regarding the content navigator region 102b. As above, aural indications (e.g., spoken information, music, sound effects, or other audio indications) can be generated to provide information regarding the GUI.

Figure 2C:
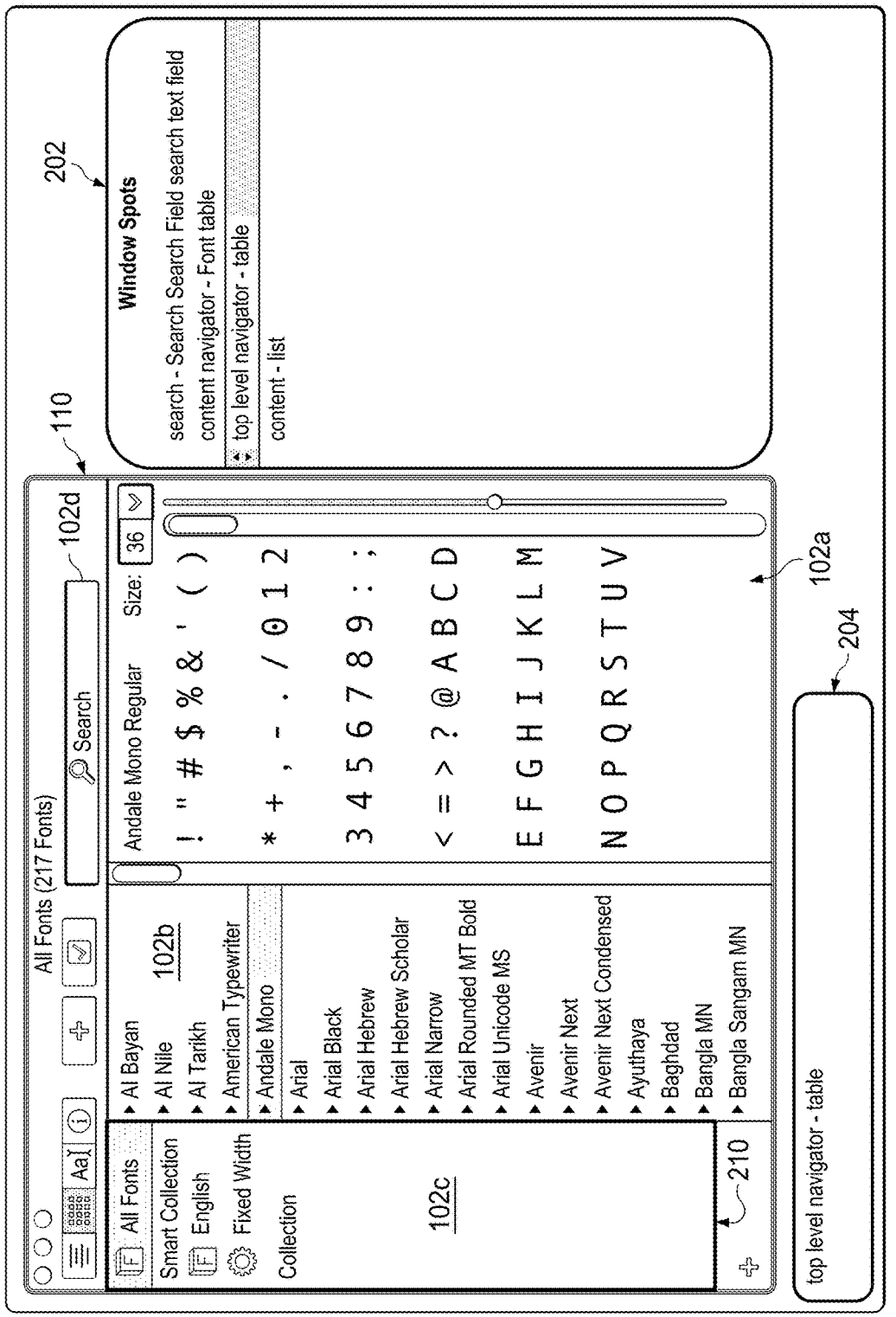

The user can continue to cycle through each of the key regions of the GUI. For example, as shown FIG. 2C, the user can instruct the electronic device to cycle forward on the list to the content top level navigator region 102c. In response, the GUI 100 visually indicates the content top level navigator region 102c with an outline 210 around the content top level navigator region 102c. Similarly, the window 204 updates to display information regarding the content top level navigator region 102c. As above, aural indications (e.g., spoken information, music, sound effects, or other audio indications) can be generated to provide information regarding the GUI.

Figure 2D:
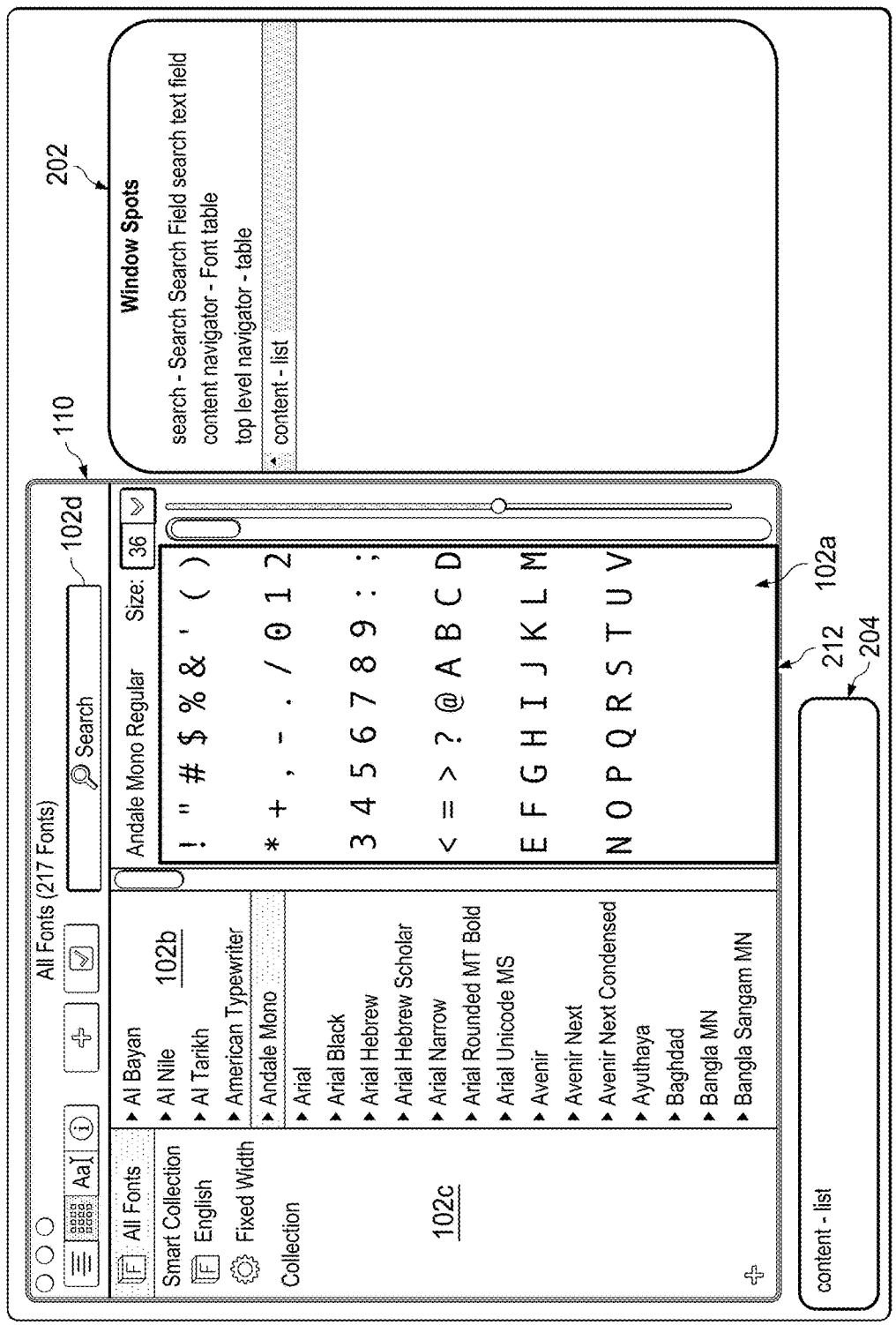

The user can continue to cycle through each of the key regions of the GUI. For example, as shown FIG. 2D, the user can instruct the electronic device to cycle forward on the list to the content region 102a. In response, the GUI 100 visually indicates the content region 102a with an outline 212 around the content region 102a. Similarly, the window 204 updates to display information regarding the content region 102a. As above, aural indications (e.g., spoken information, music, sound effects, or other audio indications) can be generated to provide information regarding the GUI.

Thus, the user can select from among the different key regions of the GUI 100 (e.g., by cycling forwards and/or backwards through the list shown in window 202) to receive visual and/or aural assistance regarding the selected key region.

In some cases, the user can also interact with the window 110 while the GUI 100 is in accessibility mode. This can be useful, for example, as it allows the user to navigate through the GUI 100, review information presented by the GUI 100, and input commands through the GUI 100 without leaving the accessibility mode. For example, as described above with respect to FIG. 2B, the user can instruct the electronic device to cycle to the content navigator region 102b. In response, the GUI 100 visually indicates the content navigator region 102b with an outline 208 around the content navigator region 102b. Similarly, the window 204 updates to display information regarding the content navigator region 102b. As above, aural indications (e.g., spoken information, music, sound effects, or other audio indications) can be generated to provide information regarding the GUI.

Figure 3:
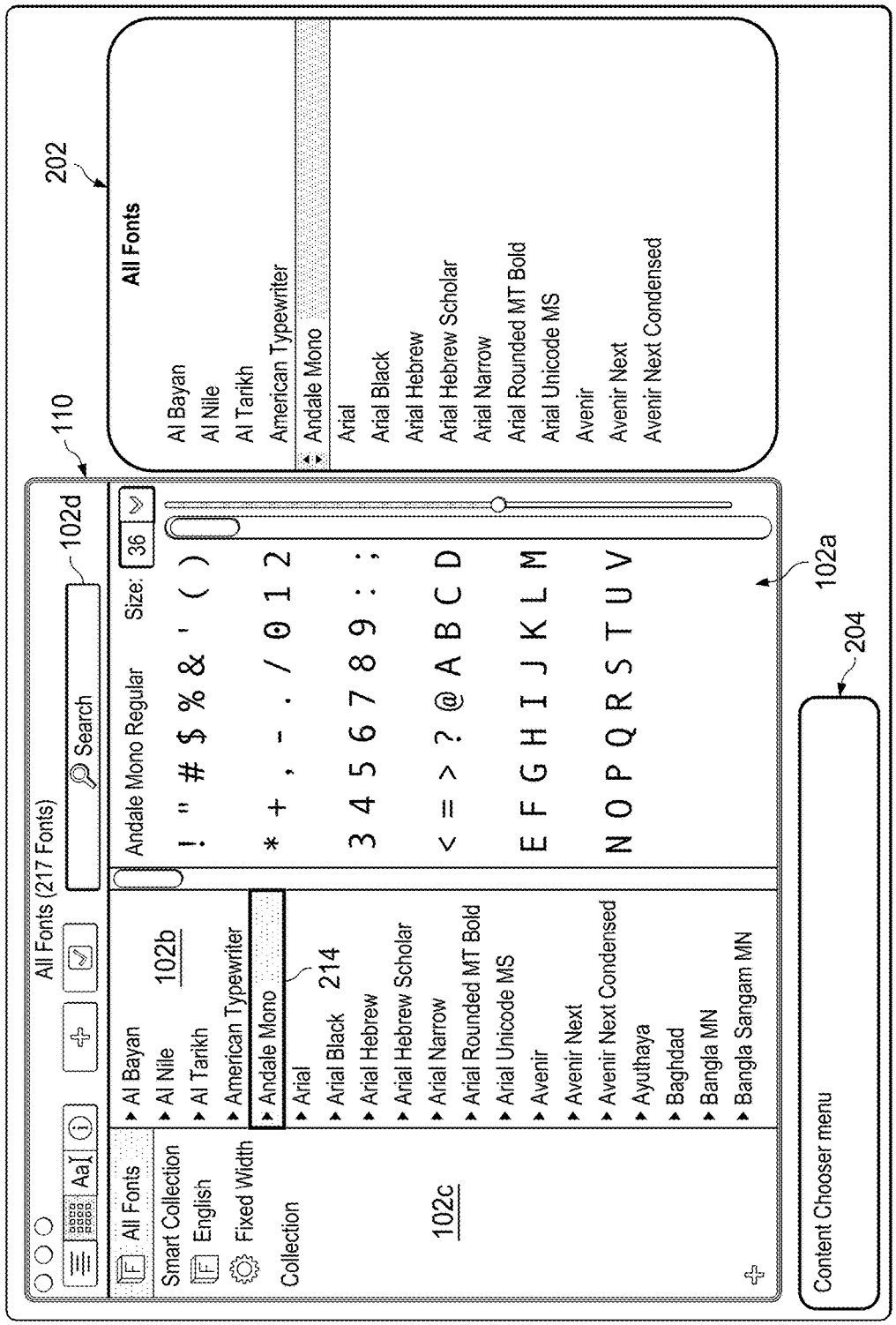

While the content navigator region 102b is selected, the user can confirm selection the content navigator region 102b (e.g., by inputting one or more keystrokes on a keyboard, performing one or more clicks on a mouse, performing one or more gestures using an input device, uttering one or more words or phrases, or a combination thereof). As shown in FIG. 3, in response, the window 202 updates to show the contents of the content navigator region 102b (e.g., by displaying a list of each of the fonts displayed in the content navigator region 102b). In a similar manner as before, the user can cycle through this list to select a particular item that he wishes to view, and the GUI 100 can display an outline 214 that visually indicates each item as the user cycles through the list. Similarly, the window 204 can update to display information regarding the selected item and/or the content navigator region 102b. The user can also reverse this selection, such that the GUI 100 returns to the previous selection (e.g., such that GUI 100 returns to the view shown in FIG. 2B). As above, aural indications (e.g., spoken information, music, sound effects, or other audio indications) can be generated to provide information regarding the GUI.

As described above, the user can interact with the GUI 100 in accessibility mode by inputting one or more keystrokes on a keyboard, performing one or more clicks on a mouse, performing one or more gestures using an input device, uttering one or more words or phrases, or a combination thereof. As an example, a user can press the arrow keys on his keyboard to cycle between each of the items shown in window 202, press the enter key to confirm his selection of a particular item, and press escape to reverse or undo a particular selection. As another example, a user can utter particular voice commands in a microphone of the electronic device, and the electronic device can interpret the voice commands using speech recognition. For instance, the user can utter "up" or "down" to cycle between each of the items shown in window 202, utter "select" to confirm his selection of a particular item, and utter "back" to reverse or undo a particular selection. As another example, a user can perform gestures on an input device (e.g., by swiping one or more fingers along a touch sensitive surface, or by making a gesture while holding an input device such as a mouse). For instance, the user can make an upward or downward gesture using an input device to cycle between each of the items shown in window 202, make a rightward gesture to confirm his selection of a particular item, and make a leftward gesture to reverse or undo a particular selection. Other combinations of inputs are also possible.

Figure 4:
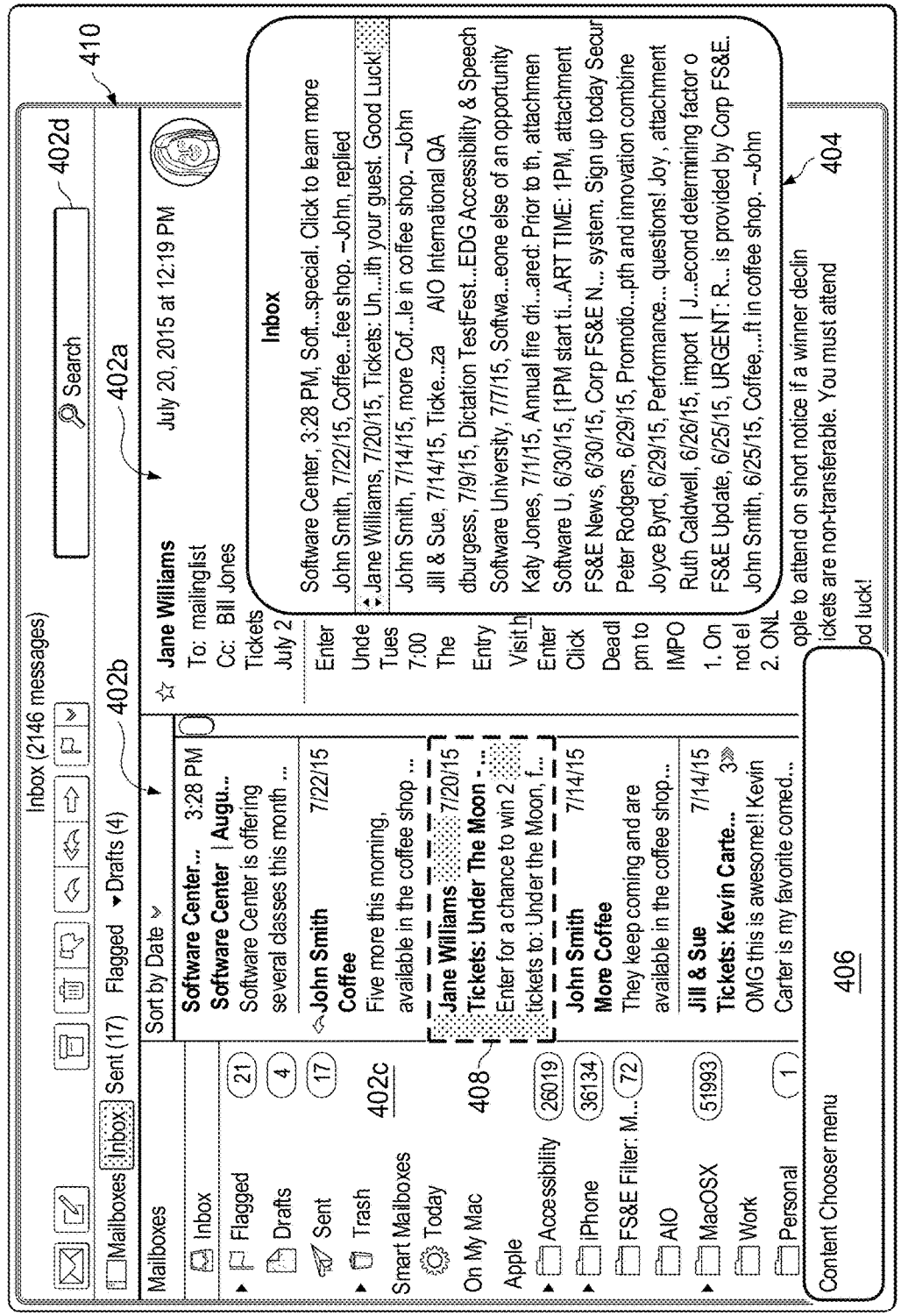
FIG. 4 illustrates another example GUI in an accessibility mode.

Although an example GUI 100 is shown and described, this is merely an illustrative example. In practice, the electronic device can provide user assistance for any GUI displayed by the electronic device. As an example, FIG. 4 shows another GUI 400 for an e-mail application. In a similar manner as with the GUI 100, the GUI 400 includes a window 410 with several key regions, including a content region 402a, a content navigator region 402b, a top level navigator region 402c, and a search bar 402d.

The GUI 400 also includes two additional windows 404 and 406. In a similar manner as with the GUI 100, the windows 404 and 406 present information from the window 410, such that the information is more readily understandable to a user. For instance, the window 404 can list each of several key regions of the GUI 400, and allow the user to cycle between each of the items in the list. As the user cycles through the list, the GUI 400 visually indicates the selection key region with an outline 408, and provides information regarding the selected key region through the window 406. Further, as the user cycles through the items in the list, he can confirm his selection of a particular item. In response, the window 404 updates to show the contents of the selected key region of the GUI 400, including any user-selectable items contained within. For instance, in the example shown in FIG. 4, the user has confirmed selection of the content navigator region 402b. Thus, the window 404 has updated to show user-selectable items (in this case, e-mail messages) that are listed in the content navigator region 402b. As above, aural indications (e.g., spoken information, music, sound effects, or other audio indications) can be generated to provide information regarding the GUI.

Although the examples above depict GUIs with a single content region, a single content navigator region, a single top level navigator region, and a single search bar, these are also merely illustrative examples. In practice, a GUI can have any number of different key regions. For example, a GUI can include a content region, a content navigator region, and a top level navigator region, but does not include a search bar. As another example, a GUI can include a content region, a content navigator region, and an intermediate level navigator region, and a top level navigator region. However, regardless of the arrangement and composition of the GUI, the electronic device can provide the user with assistance, such that the user can more readily understand and navigate through the GUI.

As described above, in some cases, an electronic device can identify one or more key regions of the GUI by parsing information from the GUI, and interpreting the parsed information according to one or more rules. These rules can define various properties and conditions upon which a portion of a GUI can be identified a key region.

For example, a rule can specify that portions of a GUI having particular geometric shapes are key regions of the GUI. In some cases, the shape of a portion of a GUI can refer to the shape of an outermost boundary of that particular portion of the GUI. Thus, in some implementations, a key region can be distinguished by identifying portions of the GUI having an outermost boundary defining one or more particular shapes. As example, in some cases a key region can be distinguished by identifying portions of the GUI that have similar or identical vertical and horizontal dimensions. As another example, in some cases a key region can be distinguished by identifying portions of the GUI that have different vertical and horizontal dimensions (e.g., having a relatively greater vertical dimension than the horizontal dimension, or vice versa). As another example, in some cases a key region can be distinguished by identifying portions of the GUI that have a particular ratio or range of ratios between its vertical and horizontal dimensions.

As another example, a rule can specify that portions of a GUI having particular geometric sizes are key regions of the GUI. In some cases, the geometric size of a portion of a GUI can refer to a length or width across one or more dimensions of the portion of the GUI. Thus, in some implementations, a key region can be distinguished by identifying portions of the GUI having a particular length and/or width or within a range of lengths and/or widths. In some cases the geographical size of a portion of a GUI can refer to the geometric area of the portion of the GUI. Thus, in some implementations, a key region can be distinguished by identifying portions of the GUI having a particular geometric area, or a geometric area within a particular range. As an example, in some cases a key region can be distinguished by identifying portions of the GUI that have a vertical dimension greater than, less than, or equal to a particular value (e.g., 100 pixels, 200 pixels, 300 pixels, or any other height). As another example, in some cases a key region can be distinguished by identifying portions of the GUI that have a horizontal dimension greater than, less than, or equal to a particular value (e.g., 100 pixels, 200 pixels, 300 pixels, or any other width).

As yet another example, a rule can specify that portions of a GUI positioned in a particular location of the GUI are key regions of the GUI. In some cases, the location of a portion of the GUI can be an absolute position (e.g., defined by coordinates on a coordinate system). Thus, in some implementations, a key region can be distinguished by identifying portions of the GUI that are positioned at particular absolute locations within the GUI. In some cases, the location of a portion of the GUI can be a relative position (e.g., the position of one portion of the GUI relative to another portion of the GUI). Thus, in some implementations, a key region can be distinguished by identifying portions of the GUI that are positioned in a particular direction (e.g., left, right, above, and/or below) with respect to other portions of the GUI. As an example, in some cases a key region can be distinguished by identifying portions of the GUI is to the far right of a window. As an example, in some cases a key region can be distinguished by identifying portions of the GUI is below another region of the GUI (e.g., below a title bar). As an example, in some cases a key region can be distinguished by identifying portions of the GUI is to the left of one or more other key regions.

As yet another example, a rule can specify that portions of a GUI having a particular hierarchical property with respect to other portions of the GUI are key regions of the GUI. In some cases, the hierarchical property can include information regarding the hierarchical level of a portion of the GUI with respect to a hierarchical tree (e.g., information indicating that the portion of the GUI is at a "child" level, a "parent" level, a "grandparent" level, or some other level within a hierarchical tree). Thus, in some implementations, a key region can be distinguished by identifying portions of the GUI that are at a particular hierarchical level. In some cases, the hierarchical property can include information regarding the relative hierarchical level of a portion of the GUI with respect to other portions of the GUI (e.g., information indicating that the portion of the GUI is a "child" to another portion of the GUI within a hierarchical tree). Thus, in some implementations, a key region can be distinguished by identifying portions of the GUI that have a particular hierarchical level relative to another portion of the GUI (e.g., a higher level, a lower level, or the same level).

As yet another example, a rule can specify that portions of a GUI having particular contents, types of content, or combinations thereof are key regions of the GUI. For instance, in some cases, a portion of the GUI can contain different types of elements, such as interactive buttons, radio buttons, tables, scroll bars, icons, text, images, text fields, and so forth. Thus, in some implementations, a key region can be distinguished by identifying portions of the GUI that include particular types of elements (e.g., one or more buttons, radio buttons, tables, scroll bars, icons, text, images, text fields, or combinations thereof).

In some cases, a key region can be distinguished by considering the size of the elements. As an example, the size of a table (e.g., how many columns and/or rows) can be used to determine if a portion of the GUI is a key region. As another example, the size of a text field (e.g., the height and/or width of the text field) can be used to determine if a portion of the GUI is a key region.

In some cases, a portion of the GUI can contain different content (e.g., different combinations of buttons, radio buttons, tables, scroll bars, icons, text, images, text fields, and/or other content). Thus, in some implementations, a key region can be distinguished by identifying portions of the GUI that include particular buttons, tables, scroll bars, icons, text, images, and/or other content.

In some cases, a portion of the GUI can contain textual information (e.g., labels, descriptions, or other text). Thus, in some implementations, a key region can be distinguished by identifying portions of the GUI that match particular keywords or strings of text. As an example, portions of the GUI having the keyword "messages" can be identified as a key region. In some cases, a key region can be identified based on grammatical or syntactical rules. As an example, a key region can be distinguished by identifying portions of the GUI that have pluralized keywords (e.g., "messages"), or by identifying portions of the GUI that have singular keywords (e.g., "message").

In some cases, key regions can be dynamically determined. For example, a portion of the GUI can be initially identified as a non-key region. However, that portion of the GUI can later be identified as a key region based on dynamic events, such as inputs made by the user, changes to the portion of the GUI (e.g., changes in the contents, dimensions, shape, size, and/or other properties of the portion of the GUI), or other dynamic factors. Similarly, a portion of the GUI can be initially identified as a key region. However, that portion of the GUI can later be identified as a non-key region based on dynamic events. Thus, key regions can be continuously identified and indicated to the user, such that the user is aware of the changing importance of each portion of the GUI.

In some cases, several different rules can be used in conjunction to determine which portions of the GUI are key regions.

As an example, the electronic device can identify a search bar by using a set of rules that define the expected properties of a search bar. For instance, the rules can specify that a search bar allows a user to enter textual information, is positioned near the top right portion of a window, and is generally larger along a horizontal dimension than in the vertical dimension.

As another example, the electronic device can identify a content region by using a set of rules that define the expected properties of a content region. For instance, the rules can specify that a content region is relatively larger than other portions of the GUI, includes a scroll bar, has a hierarchical level that is lower than other portions of the GUI (e.g., the content navigator region), and is positioned to the right of other portions of the GUI (e.g., the content navigator region).

As another example, the electronic device can identify a content navigator region by using a set of rules that define the expected properties of a content navigator region. For instance, the rules can specify that a content navigator region includes a scroll bar, has a hierarchical level that is higher than some portions of the GUI (e.g., the content region) and lower than other portions of the GUI (e.g., the top level navigator region), and is positioned to the left of some portions of the GUI (e.g., the content region) and to the right of other portions of the GUI (e.g., the top level navigator region).

As yet another example, the electronic device can identify a top level navigator region by using a set of rules that define the expected properties of a top level navigator region. For instance, the rules can specify that a top level navigator region includes a scroll bar, has a hierarchical level that is higher than other portions of the GUI (e.g., the content region and the content navigator region), and is positioned to the left of other portions of the GUI (e.g., the content region and the content navigator region).

Although example sets of rules are described, these are merely illustrative examples. In practice, any number of rules can be used to identify any particular region of a GUI. For instance, if an application's GUI is designed in accordance with a particular set of design standards (e.g., a set of guidelines provided to application developers), an appropriate set of rules can be used to identify portions of the GUI in accordance with those guidelines. As an example, if design standards dictate that a content region be positioned, shaped, and/or sized in a particular manner, an appropriate set of rules can be used to identify portions of the GUI having the prescribed position, shape, and/or size.

In some cases, when a software developer develops an application having a GUI, the software developer need not specifically include information that explicitly identifies each of the portions of the GUI as key regions. Instead, the electronic device can parse the GUI, then automatically make a determination based on one or more rules. As such, the electronic device can provide the user with assistance, even if the GUI had not been designed with this functionality in mind.

Example Processes

Figure 5:
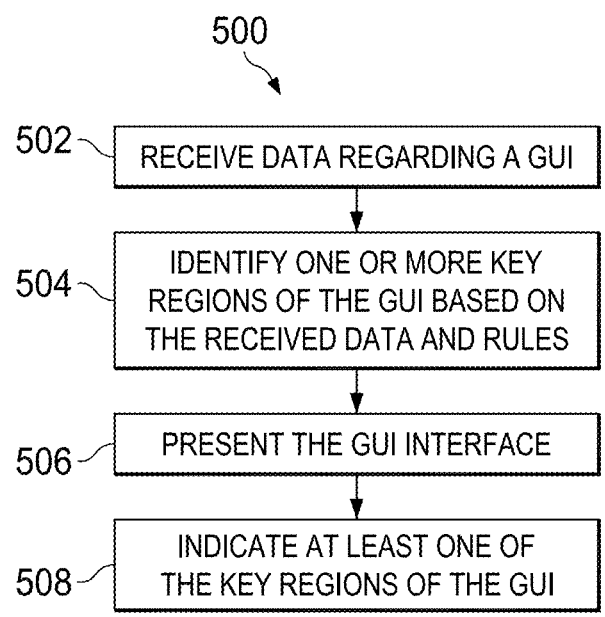
FIG. 5 is a flow diagram of an example process for identifying and indicating the key regions of a GUI.

FIG. 5 is a flow diagram of an example process 500 for identifying and indicating the key regions of a GUI. In some implementations, the process 500 can be implemented using, for example, the device architecture 600 shown in FIG. 6.

The process 500 begins by receiving, in an electronic device, data regarding a GUI to be presented on a display of the electronic device (step 502). As described above, in some cases, this data can be the underlying computer code is used to generate or render the GUI. For example, an application might include computer code that, when executed by the electronic device, causes the electronic device to generate and present one or more visual elements on a device screen. In some cases, this data can be an image of the GUI, or some other graphical representation of the GUI. In some cases, this data can include a combination of computer code and one or more images of the GUI.

After receipt of the data regarding the GUI, the electronic device identifies one or more key regions of the GUI based on the received data and one or more rules (step 504). As described above, in some cases, the electronic device can parse the received information, then interpret the parsed information according to one or more rules. For example, the electronic device can parse received computer code, then interpret the parsed computer code according to one or more rules. As another example, the electronic device can parse received images of the GUI, then interpret the parsed images (e.g., using image analysis techniques) according to one or more rules.

As described above, the one or more rules can define various properties and conditions upon which a portion of a GUI can be identified as a key region. For instance, the one or more rules can pertain to a geometric shape, a geometric size, a location, a hierarchical property, the contents, or the types of contents of one or more graphical elements of the GUI, or a combination of multiple different criteria. For example, a rule can specify that portions of a GUI having particular geometric shapes are key regions of the GUI. As another example, a rule can specify that portions of a GUI having particular geometric sizes are key regions of the GUI. As yet another example, a rule can specify that portions of a GUI positioned in a particular location of the GUI are key regions of the GUI. As yet another example, a rule can specify that portions of a GUI having a particular hierarchical property with respect to other portions of the GUI are key regions of the GUI. As yet another example, a rule can specify that portions of a GUI having particular contents, types of contents, or combinations thereof are key regions of the GUI. In some cases, several different rules can be used in conjunction to determine which portions of the GUI are key regions.

As described above, the key regions of a GUI can include, for example, regions of the GUI that present available commands, selection options, content, and/or other information of relatively greater importance or pertinence to the user. These regions can include, for instance, a content region that displays content to a user, a content navigator region that allows the user to select information that he wishes to view (e.g., by selecting information that he wishes to view in the content region), a top level navigator region that also allows the user to select information that he wishes to view (e.g., by selecting information that he wishes to view in the content navigator region and/or content region), and a search bar (e.g., an input region that allows the user to input one or more criteria to filter the information shown in the GUI). Regions that are not key regions can include, for example, portions of the GUI that are presented solely or primarily for cosmetic or aesthetic purposes. For example, portions of the GUI that provide space or padding between the key regions of the GUI, in some cases, are not considered key regions. Regions that are not key regions can also include, for example, portions of the GUI that include relatively unimportant or unrelated information.

As also described above, the received data need not explicitly identify portions of the graphical user interface as the one or more key regions. For example, when a software developer develops an application having the GUI, the software developer need not specifically include information that explicitly identifies each of the portions of the GUI as key regions (e.g., "key region" flags, labels, strings of text, or other identifiers that explicitly identify particular portions of the GUI as key regions). Instead, the electronic device can parse the GUI, then automatically make a determination based on one or more rules. As such, the electronic device can provide the user with assistance, even if the GUI had not been designed with this functionality in mind.

The electronic device also presents the GUI on the display of the electronic device (step 506). As an example, the electronic device can generate or render the GUI in accordance with the underlying computer code, then display the generated or rendered GUI on a display device (e.g., the touch surface 646 shown in FIG. 6).

The electronic device also indicates at least one of the key regions of the graphical user interface using the electronic device (step 508). As described above, the electronic device can visually indicate the key regions, for example by highlighting, outlining, expanding, and/or re-presenting information from the key regions, such that the key regions and/or the information contained within these regions are more visually distinctive within the GUI. This visual indication allows the user to more readily identify a particular key region of the GUI, and visually distinguish it from the other portions of the GUI.

In some cases, the electronic device can aurally indicate information regarding at least one of the key regions of the GUI. This can be performed, for instance, using the audio subsystem 626 and speaker 628 shown in FIG. 6. For example, the electronic device can generate a spoken description of the information contained within a key region, such that the user can understand the contents of the GUI without having to view the GUI. As another example, the electronic device can generate music, sound effects, or other audio indications to provide information regarding a key region. For instance, each portion of the GUI can be associated with a particular unique sound, and the electronic device can playback these sounds to indicate different portions of the GUI.

In some cases, a user can instruct the electronic device to cycle or step through multiple different regions of the GUI. For example, the electronic device can identify multiple different key regions of a GUI, then display a list of the identified regions to the user. The user can select a key region from among the list, and in response, the electronic device can indicate the selected region to the user. This indication can be, for example, a visual indication, an aural indication, or both.

Example Client Device Architecture

Figure 6:
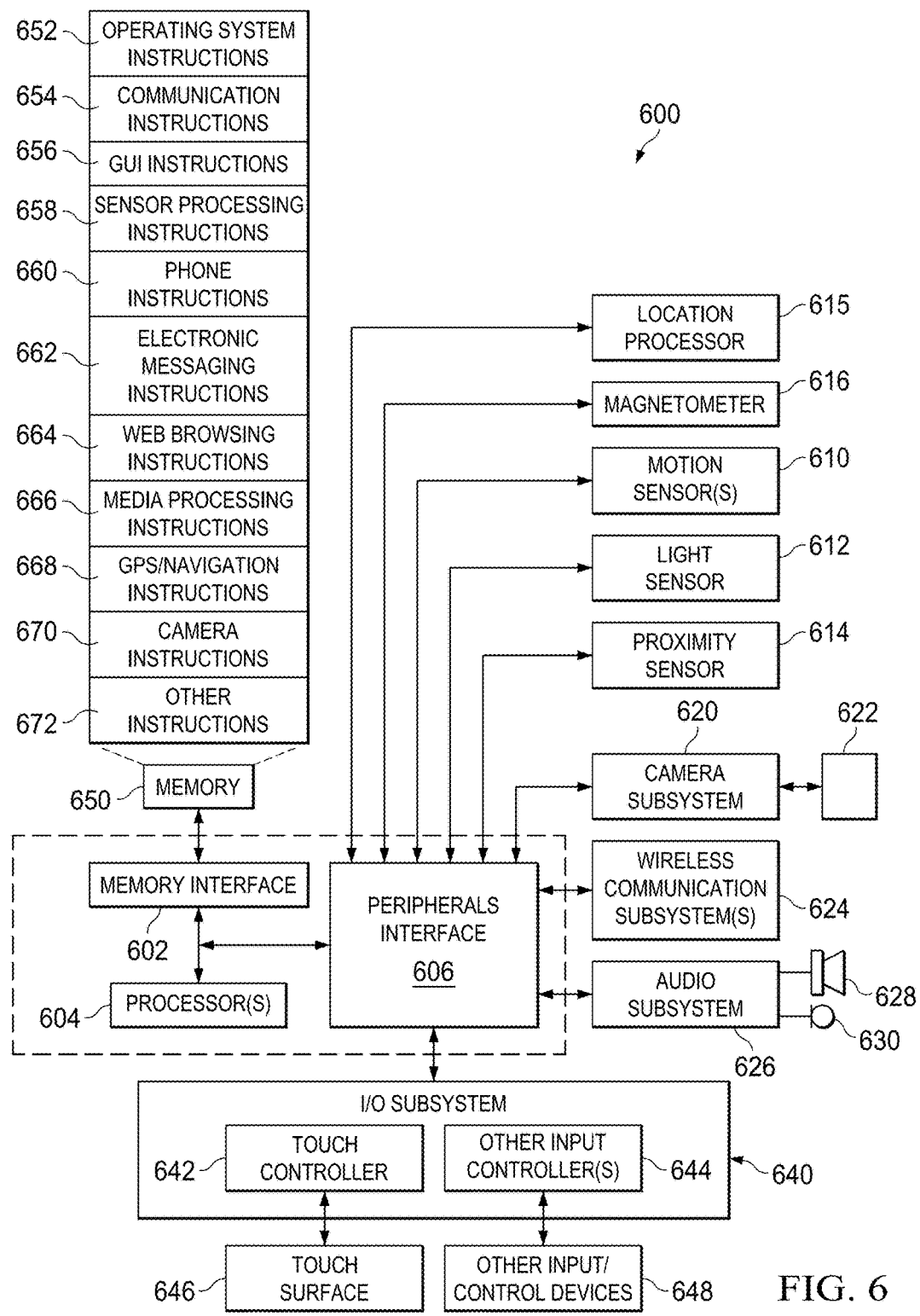
FIG. 6 is a block diagram of an example client device architecture for implementing the features and processes described in reference to FIGS. 1-5.

FIG. 6 is a block diagram of an example client device architecture 600 for implementing the features and processes described in reference to FIGS. 1-5. Architecture 600 may be implemented in any mobile device for generating the features described in reference to FIGS. 1-5, including but not limited to portable computers, smart phones, tablet computers, game consoles, wearable computers and the like. Architecture 600 may include memory interface 602, data processor(s), image processor(s) or central processing unit (s) 604, and peripherals interface 606. Memory interface 602, processor(s) 604 or peripherals interface 606 may be separate components or may be integrated in one or more integrated circuits. One or more communication buses or signal lines may couple the various components.

Sensors, devices, and subsystems may be coupled to peripherals interface 606 to facilitate multiple functionalities. For example, motion sensor 610, light sensor 612, and proximity sensor 614 may be coupled to peripherals interface 606 to facilitate orientation, lighting, and proximity functions of the device. For example, in some implementations, light sensor 612 may be utilized to facilitate adjusting the brightness of touch surface 646. In some implementations, motion sensor 610 (e.g., an accelerometer, gyros) may be utilized to detect movement and orientation of the device. Accordingly, display objects or media may be presented according to a detected orientation (e.g., portrait or landscape).

Other sensors may also be connected to peripherals interface 606, such as a temperature sensor, a biometric sensor, or other sensing device, to facilitate related functionalities.

Location processor 615 (e.g., GNSS receiver chip) may be connected to peripherals interface 606 to provide georeferencing. Electronic magnetometer 616 (e.g., an integrated circuit chip) may also be connected to peripherals interface 606 to provide data that may be used to determine the direction of magnetic North. Thus, electronic magnetometer 616 may be used as an electronic compass.

Camera subsystem 620 and an optical sensor 622, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 624. Communication subsystem(s) 624 may include one or more wireless communication subsystems. Wireless communication subsystems 624 may include radio frequency receivers and transmitters and/or optical (e.g., infrared) receivers and transmitters. Wired communication system may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystem 624 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., Wi-Fi, Wi-Max), code division multiple access (CDMA) networks, NFC and a Bluetooth™ network. Wireless communication subsystems 624 may include hosting protocols such that the device may be configured as a base station for other wireless devices. As another example, the communication subsystems may allow the device to synchronize with a host device using one or more protocols, such as, for example, the TCP/IP protocol, HTTP protocol, UDP protocol, and any other known protocol.

Audio subsystem 626 may be coupled to a speaker 628 and one or more microphones 630 to facilitate voice-enabled functions, such as voice recognition, voice replication, digital recording, and telephony functions.

I/O subsystem 640 may include touch controller 642 and/or other input controller(s) 644. Touch controller 642 may be coupled to a touch surface 646. Touch surface 646 and touch controller 642 may, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 646. In one implementation, touch surface 646 may display virtual or soft buttons and a virtual keyboard, which may be used as an input/output device by the user.

Other input controller(s) 644 may be coupled to other input/control devices 648, such as one or more buttons, rocker switches, thumb-wheel, infrared port, USB port, and/or a pointer device such as a stylus. The one or more buttons (not shown) may include an up/down button for volume control of speaker 628 and/or microphone 630.

In some implementations, a device having device architecture 600 may present recorded audio and/or video files, such as MP3, AAC, and MPEG video files. In some implementations, a device having device architecture 600 may include the functionality of an MP3 player and may include a pin connector for tethering to other devices. Other input/output and control devices may be used.

Memory interface 602 may be coupled to memory 650. Memory 650 may include high-speed random access memory or non-volatile memory, such as one or more magnetic disk storage devices, one or more optical storage devices, or flash memory (e.g., NAND, NOR). Memory 650 may store operating system 652, such as Darwin, RTXC, LINUX, UNIX, OS X, WINDOWS, or an embedded operating system such as VxWorks. Operating system 652 may include instructions for handling basic system services and for performing hardware dependent tasks. In some implementations, operating system 652 may include a kernel (e.g., UNIX kernel).

Memory 650 may also store communication instructions 654 to facilitate communicating with one or more additional devices, one or more computers or servers, including peer-to-peer communications. Communication instructions 654 may also be used to select an operational mode or communication medium for use by the device, based on a geographic location (obtained by the GPS/Navigation instructions 668) of the device. Memory 650 may include graphical user interface instructions 656 to facilitate graphic user interface processing, including a touch model for interpreting touch inputs and gestures; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GPS/Navigation instructions 668 to facilitate GPS and navigation-related processes; camera instructions 670 to facilitate camera-related processes and functions; and other instructions 672 for performing some or all of the processes, as described in reference to FIGS. 1-5.

Each of the above identified instructions and applications may correspond to a set of instructions for performing one or more functions described above. These instructions need not be implemented as separate software programs, procedures, or modules. Memory 650 may include additional instructions or fewer instructions. Furthermore, various functions of the device may be implemented in hardware and/or in software, including in one or more signal processing and/or application specific integrated circuits (ASICs).

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
    receiving, in an electronic device, data regarding a graphical user interface to be presented on a display of the electronic device;
    determining, at the electronic device and based on the received data, that one or more rules are satisfied, the one or more rules specifying at least one of a geometric shape of one or more portions of the graphical user interface indicative of a key region, a geometric size of one or more portions of the graphical user interface indicative of a key region, a location of one or more portions of the graphical user interface indicative of a key region, or a hierarchical property of one or more portions of the graphical user interface indicative of a key region;
    responsive to the determining, identifying, at the electronic device, one or more key regions of the graphical user interface;
    presenting, on the display of the electronic device, the graphical user interface; and
    indicating, using the electronic device, at least one of the key regions of the graphical user interface.

2. The method of claim 1, wherein indicating at least one of the key regions of the graphical user interface comprises visually indicating, on the display of the electronic device, at least one of the key regions of the graphical user interface.

3. The method of claim 1, wherein indicating at least one of the key regions of the graphical user interface comprises aurally indicating, using an audio output of the electronic device, information regarding at least one of the key regions of the graphical user interface.

4. The method of claim 3, wherein aurally indicating information regarding at least one of the key regions of the graphical user interface comprises outputting a spoken description of contents of at least one of the key regions.

5. The method of claim 1, wherein determining that the one or more rules are satisfied comprises:
    determining a geometric shape of a first portion of the graphical user interface based on the received data; and
    determining that the geometric shape of the first portion of the graphical user interface satisfies at least one of the rules; and
    wherein identifying the one or more key regions of the graphical user interface comprises, responsive to determining that the geometric shape of the first portion of the graphical user interface satisfies at least one of the rules, identifying the first portion of the graphical user interface as one of the key regions.

6. The method of claim 1, wherein determining that the one or more rules are satisfied comprises:
    determining a geometric size of a first portion of the graphical user interface based on the received data; and
    determining that the geometric size of the first portion of the graphical user interface satisfies at least one of the rules; and
    wherein identifying the one or more key regions of the graphical user interface comprises, responsive to determining that the geometric size of the first portion of the graphical user interface satisfies at least one of the rules, identifying the first portion of the graphical user interface as one of the key regions.

7. The method of claim 1, wherein determining that the one or more rules are satisfied comprises:
    determining a location of a first portion of the graphical user interface based on the received data; and
    determining that the location of the first portion of the graphical user interface satisfies at least one of the rules; and
    wherein identifying the one or more key regions of the graphical user interface comprises, responsive to determining that the location of the first portion of the graphical user interface satisfies at least one of the rules, identifying the first portion of the graphical user interface as one of the key regions.

8. The method of claim 1, wherein determining that the one or more rules are satisfied comprises:
    determining a hierarchical relationship between a first portion of the graphical user interface with one or more other portions of the graphical user interface based on the received data; and
    determining that the hierarchical relationship satisfies at least one of the rules; and wherein identifying the one or more key regions of the graphical user interface comprises, responsive to determining that the hierarchical relationship satisfies at least one of the rules, identifying the first portion of the graphical user interface as one of the key regions.

9. The method of claim 1, wherein determining that the one or more rules are satisfied comprises:
   determining contents of a first portion of the graphical user interface based on the received data; and
   determining that the contents of the first portion of the graphical user interface satisfies at least one of the rules; and
   wherein identifying the one or more key regions of the graphical user interface comprises, responsive to determining that the contents of the first portion of the graphical user interface satisfies at least one of the rules, identifying the first portion of the graphical user interface as one of the key regions.

10. The method of claim 9, wherein the contents of the first portion of the graphical user interface comprise at least one of a button, a radio button, a table, a scroll bar, an icon, a text string, an image, or a text field; and
    wherein the contents of the first portion of the graphical user interface satisfies at least one of the rules if the contents of first portion of the graphical user interface contains a particular combination of buttons, radio buttons, tables, scroll bars, icons, text strings, images, and/or text fields.

11. The method of claim 1, wherein at least one of the key regions corresponds to a navigation portion of the graphical user interface, a content selection portion of the graphical user interface, or a content presentation portion of the graphical user interface.

12. The method of claim 1, further comprising:
    receiving, at the electronic device, a user input specifying that another identified key region be indicated on the graphical user interface; and
    responsive to receiving the user input, indicating, using the electronic device, another identified key region of the graphical user interface.

13. The method of claim 1, wherein the received data does not explicitly identify portions of the graphical user interface as the one or more key regions.

14. A system comprising:
    a display device;
    one or more processors; and
    a non-transitory computer-readable medium including one or more sequences of instructions which, when executed by the one or more processors, causes:
      receiving data regarding a graphical user interface to be presented on the display device;
      determining, by the one or more processors and based on the received data, that one or more rules are satisfied, the one or more rules specifying at least one of a geometric shape of one or more portions of the graphical user interface indicative of a key region, a geometric size of one or more portions of the graphical user interface indicative of a key region, a location of one or more portions of the graphical user interface indicative of a key region, or a hierarchical property of one or more portions of the graphical user interface indicative of a key region;
      responsive to the determining, identifying one or more key regions of the graphical user interface;
      presenting, on the display device, the graphical user interface; and
      indicating at least one of the key regions of the graphical user interface.

15. The system of claim 14, wherein indicating at least one of the key regions of the graphical user interface comprises visually indicating, on the display device, at least one of the key regions of the graphical user interface.

16. The system of claim 14, wherein indicating at least one of the key regions of the graphical user interface comprises aurally indicating, using an audio device, information regarding at least one of the key regions of the graphical user interface.

17. The system of claim 16, wherein aurally indicating information regarding at least one of the key regions of the graphical user interface comprises outputting a spoken description of contents of at least one of the key regions.

18. The system of claim 14, wherein determining that the one or more rules are satisfied comprises:
    determining a geometric shape of a first portion of the graphical user interface based on the received data; and
    determining that the geometric shape of the first portion of the graphical user interface satisfies at least one of the rules; and
    wherein identifying the one or more key regions of the graphical user interface comprises, responsive to determining that the geometric shape of the first portion of the graphical user interface satisfies at least one of the rules, identifying the first portion of the graphical user interface as one of the key regions.

19. The system of claim 14, wherein determining that the one or more rules are satisfied comprises:
    determining a geometric size of a first portion of the graphical user interface based on the received data; and
    determining that the geometric size of the first portion of the graphical user interface satisfies at least one of the rules; and
    wherein identifying the one or more key regions of the graphical user interface comprises, responsive to determining that the geometric size of the first portion of the graphical user interface satisfies at least one of the rules, identifying the first portion of the graphical user interface as one of the key regions.

20. The system of claim 14, wherein determining that the one or more rules are satisfied comprises:
    determining a location of a first portion of the graphical user interface based on the received data; and
    determining that the location of the first portion of the graphical user interface satisfies at least one of the rules; and
    wherein identifying the one or more key regions of the graphical user interface comprises, responsive to determining that the location of the first portion of the graphical user interface satisfies at least one of the rules, identifying the first portion of the graphical user interface as one of the key regions.

21. The system of claim 14, wherein determining that the one or more rules are satisfied comprises:
    determining a hierarchical relationship between a first portion of the graphical user interface with one or more other portions of the graphical user interface based on the received data; and
    determining that the hierarchical relationship satisfies at least one of the rules; and
    wherein identifying the one or more key regions of the graphical user interface comprises, responsive to determining that the hierarchical relationship satisfies at least one of the rules, identifying the first portion of the graphical user interface as one of the key regions.

22. The system of claim 14, wherein determining that the one or more rules are satisfied comprises:
  determining contents of a first portion of the graphical user interface based on the received data; and
  determining that the contents of the first portion of the graphical user interface satisfies at least one of the rules; and
  wherein identifying the one or more key regions of the graphical user interface comprises, responsive to determining that the contents of the first portion of the graphical user interface satisfies at least one of the rules, identifying the first portion of the graphical user interface as one of the key regions.

23. The system of claim 22, wherein the contents of the first portion of the graphical user interface comprise at least one of a button, a radio button, a table, a scroll bar, an icon, a text string, an image, or a text field; and
  wherein the contents of the first portion of the graphical user interface satisfies at least one of the rules if the contents of first portion of the graphical user interface contains a particular combination of buttons, radio buttons, tables, scroll bars, icons, text strings, images, and/or text fields.

24. The system of claim 14, wherein at least one of the key regions corresponds to a navigation portion of the graphical user interface, a content selection portion of the graphical user interface, or a content presentation portion of the graphical user interface.

25. The system of claim 14, wherein the one or more sequences of instructions, when executed by the one or more processes, further causes:
  receiving, at the system, a user input specifying that another identified key region be indicated on the graphical user interface; and
  responsive to receiving the user input, indicating another identified key region of the graphical user interface.

26. The system of claim 14, wherein the received data does not explicitly identify portions of the graphical user interface as the one or more key regions.

27. A non-transitory computer-readable medium including one or more sequences of instructions which, when executed by one or more processors, causes:
  receiving, in an electronic device, data regarding a graphical user interface to be presented on a display of the electronic device;
  determining, at the electronic device and based on the received data, that one or more rules are satisfied, the one or more rules specifying at least one of a geometric shape of one or more portions of the graphical user interface indicative of a key region, a geometric size of one or more portions of the graphical user interface indicative of a key region, a location of one or more portions of the graphical user interface indicative of a key region, or a hierarchical property of one or more portions of the graphical user interface indicative of a key region
  responsive to the determining, identifying, at the electronic device, one or more key regions of the graphical user interface;
  presenting, on the display of the electronic device, the graphical user interface; and
  indicating, using the electronic device, at least one of the key regions of the graphical user interface.

28. The transitory computer-readable medium of claim 27, wherein indicating at least one of the key regions of the graphical user interface comprises visually indicating, on the display of the electronic device, at least one of the key regions of the graphical user interface.

29. The transitory computer-readable medium of claim 27, wherein indicating at least one of the key regions of the graphical user interface comprises aurally indicating, using an audio output of the electronic device, information regarding at least one of the key regions of the graphical user interface.

30. The transitory computer-readable medium of claim 29, wherein aurally indicating information regarding at least one of the key regions of the graphical user interface comprises outputting a spoken description of contents of at least one of the key regions.

31. The non-transitory computer-readable medium of claim 27, wherein determining that the one or more rules are satisfied comprises:
  determining a geometric shape of a first portion of the graphical user interface based on the received data; and
  determining that the geometric shape of the first portion of the graphical user interface satisfies at least one of the rules; and
  wherein identifying the one or more key regions of the graphical user interface comprises, responsive to determining that the geometric shape of the first portion of the graphical user interface satisfies at least one of the rules, identifying the first portion of the graphical user interface as one of the key regions.

32. The non-transitory computer-readable medium of claim 27, wherein determining that the one or more rules are satisfied comprises:
  determining a geometric size of a first portion of the graphical user interface based on the received data; and
  determining that the geometric size of the first portion of the graphical user interface satisfies at least one of the rules; and
  wherein identifying the one or more key regions of the graphical user interface comprises, responsive to determining that the geometric size of the first portion of the graphical user interface satisfies at least one of the rules, identifying the first portion of the graphical user interface as one of the key regions.

33. The non-transitory computer-readable medium of claim 27, wherein determining that the one or more rules are satisfied comprises:
  determining a location of a first portion of the graphical user interface based on the received data; and
  determining that the location of the first portion of the graphical user interface satisfies at least one of the rules; and
  wherein identifying the one or more key regions of the graphical user interface comprises, responsive to determining that the location of the first portion of the graphical user interface satisfies at least one of the rules, identifying the first portion of the graphical user interface as one of the key regions.

34. The non-transitory computer-readable medium of claim 27, wherein determining that the one or more rules are satisfied comprises:
  determining a hierarchical relationship between a first portion of the graphical user interface with one or more other portions of the graphical user interface based on the received data; and
  determining that the hierarchical relationship satisfies at least one of the rules; and
  wherein identifying the one or more key regions of the graphical user interface comprises, responsive to determining that the hierarchical relationship satisfies at least one of the rules, identifying the first portion of the graphical user interface as one of the key regions.

35. The non-transitory computer-readable medium of claim 27, wherein determining that the one or more rules are satisfied comprises:
   determining contents of a first portion of the graphical user interface based on the received data;
   determining that the contents of the first portion of the graphical user interface satisfies at least one of the rules; and
   wherein identifying the one or more key regions of the graphical user interface comprises, responsive to determining that the contents of the first portion of the graphical user interface satisfies at least one of the rules, identifying the first portion of the graphical user interface as one of the key regions.

36. The non-transitory computer-readable medium of claim 35, wherein the contents of the first portion of the graphical user interface comprise at least one of a button, a radio button, a table, a scroll bar, an icon, a text string, an image, or a text field; and
   wherein the contents of the first portion of the graphical user interface satisfies at least one of the rules if the contents of the first portion of the graphical user interface contains a particular combination of buttons, radio buttons, tables, scroll bars, icons, text strings, images, and/or text fields.

37. The non-transitory computer-readable medium of claim 27, wherein at least one of the key regions corresponds to a navigation portion of the graphical user interface, a content selection portion of the graphical user interface, or a content presentation portion of the graphical user interface.

38. The non-transitory computer-readable medium of claim 27, wherein the one or more sequences of instructions, when executed by one or more processors, further causes:
   receiving, at the electronic device, a user input specifying that another identified key region be indicated on the graphical user interface; and
   responsive to receiving the user input, indicating, using the electronic device, another identified key region of the graphical user interface.

39. The non-transitory computer-readable medium of claim 27, wherein the received data does not explicitly identify portions of the graphical user interface as the one or more key regions.

\* \* \* \* \*

UNITED STATES PATENT AND TRADEMARK OFFICE
CERTIFICATE OF CORRECTION

PATENT NO. : 10,223,065 B2
APPLICATION NO. : 14/871422
DATED : March 5, 2019
INVENTOR(S) : Patti Pei-Chin Hoa, Gregory F. Hughes and Reginald Dean Hudson Page 1 of 1

It is certified that error appears in the above-identified patent and that said Letters Patent is hereby corrected as shown below:

In the Claims

Column 23, Line 65, Claim 28, replace "transitory" with -- non-transitory --;

Column 24, Line 3, Claim 29, replace "transitory" with -- non-transitory --;

Column 24, Line 9, Claim 30, replace "transitory" with -- non-transitory --.

Signed and Sealed this
Ninth Day of June, 2020

Andrei Iancu
*Director of the United States Patent and Trademark Office*